United States Patent [19]

Tanaka

[11] Patent Number: 4,517,711
[45] Date of Patent: May 21, 1985

[54] PLATE CLAMPING DEVICE

[75] Inventor: Toshie Tanaka, Tokyo, Japan

[73] Assignee: Nifco Inc., Yokohama, Japan

[21] Appl. No.: 469,190

[22] Filed: Mar. 29, 1983

[30] Foreign Application Priority Data

Mar. 4, 1982 [JP] Japan .......................... 57-29560[U]

[51] Int. Cl.³ ............................................ A44B 17/00
[52] U.S. Cl. ...................................... 24/453; 24/297; 411/508
[58] Field of Search ................. 24/289, 292, 295, 297, 24/305, 335, 336, 341, 453, 457, 458; 411/15, 61, 508, 509, 510, 548; 248/27.3, 73, 221.3, 221.4, 239; 174/138 D

[56] References Cited

U.S. PATENT DOCUMENTS

| | | | |
|---|---|---|---|
| 2,451,591 | 10/1948 | Tinnerman et al. | 24/453 X |
| 3,024,509 | 3/1962 | Hamann | 248/73 |
| 3,040,401 | 6/1962 | Von Rath | 24/297 |
| 3,126,183 | 3/1964 | Hopkins | 248/73 |
| 3,476,008 | 11/1969 | Pearson et al. | 411/508 |
| 3,991,446 | 11/1976 | Mooney et al. | 411/508 X |
| 4,080,522 | 3/1978 | Schimmels | 248/27.3 X |
| 4,312,614 | 1/1982 | Palmer et al. | 411/508 X |

Primary Examiner—Francis K. Zugel
Assistant Examiner—James R. Brittain
Attorney, Agent, or Firm—J. R. Halvorsen; T. W. Buckman

[57] ABSTRACT

Disclosed is a device for clamping two plates with their surfaces laid on each other, comprising a hollow head, a hollow trunk provided on each side with a side catch and provided with a tongue between its opposite sides, a leg extension hinged to the trunk and provided with a front catch, and a foot integrally connected to the end of the leg extension. In use, the leg extension is folded to fit in the trunk hollow space, and at the same time, the foot is pushed in the head hollow space. The folded body is pushed in a fixing aperture made in a first plate until its side catches engage the undersurface of the aperture edge. Then, the first plate is pushed against a second plate with the folded clamp inserted in a fixing aperture made in the second plate until its front catch engages the undersurface of the aperture edge of the second plate. In unclamping, the foot is pushed against the resilient tongue to disengage the front catch from the underlying plate, and then the overlying plate can be readily detached from the underlying plate.

4 Claims, 5 Drawing Figures

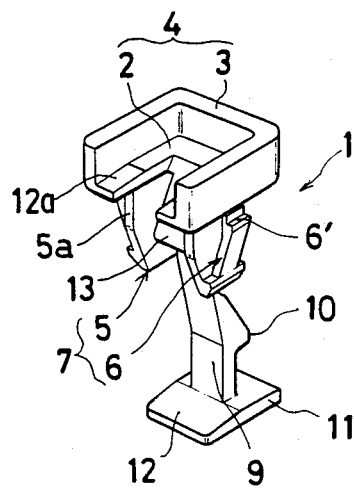
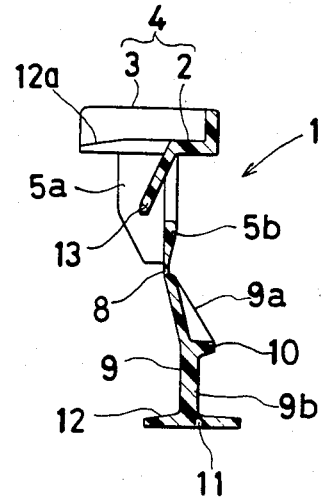
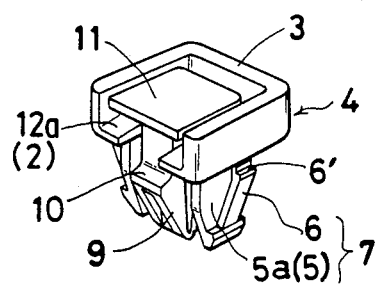
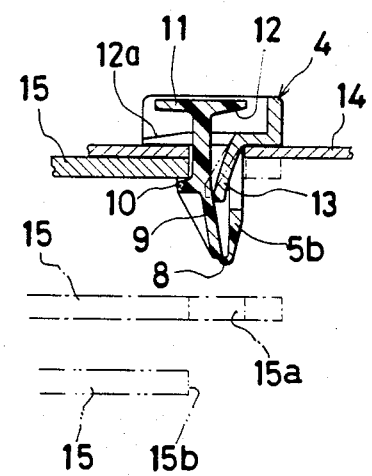
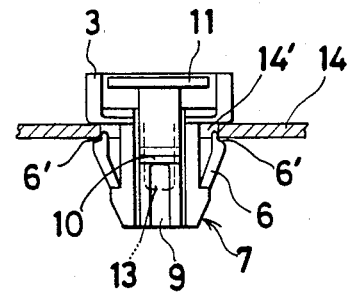

4,517,711

PLATE CLAMPING DEVICE

BACKGROUND OF THE INVENTION

1. Field of the Invention

This invention relates to a clamping device, and more particularly to a device for clamping two panels with their surfaces laid on each other in the condition of their being readily unclamped and separated from each other. The clamping device, molded of plastic, can also be used as a lid or cover latching device.

2. Description of the Prior Art

There are a variety of panel-to-panel clamping devices or lid or cover latching devices. With a view to assuring reliable clamping or latching, these devices are constructed so as to have a strong clamping or latching force. When a hinged lid or cover is equipped with such a latching device, the lid or cover can be latched by pushing and closing the same. The pushing force required is relatively weak, and is of a nature causing a pleasing or comfortable feeling. Contrary to this, when opening the lid or cover the opening force must be strong enough to overcome the increased latching force.

The inventor proposed a latching device requiring a relatively weak force for both latching and unlatching, but still assuring reliable latching. The proposed latch comprises a spring-catch adapted to project from one side of an associated housing, and a thumb piece connected to the spring-catch. Unlatching can be easily performed simply by raising the thumb piece to withdraw the spring-catch. The proposed device makes good use of the principle of leverage according to which the spring-catch can be withdrawn against its strong latching force simply by raising the thumb piece lightly. It, however, cannot assure application of a clamping force to the two panels all the time. Therefore, if the device is used for holding relatively heavy or vibrating panels other than a lid or cover, a good latching effect can hardly be expected. Other conventional latching devices are relatively complicated in structure, and are difficult to mold of plastic.

SUMMARY OF THE INVENTION

One object of this invention is to provide a plastic-molded device for clamping two panels with their surfaces laid on each other, permitting the unlatching or unclamping with a reduced force in spite of an increased latching or clamping force.

Another object of this invention is to provide a clamping device which is simple in structure and is easy to mold of plastic.

To attain these objects a clamping device according to this invention comprises a hollow head open along one side as well as at its top, two opposite depending side elements each provided with a one-way side catch and integrally connected crosswise to each other with an intermediate waist, a tongue integrally connected at one end thereof to the head in the form of a cantilever and projecting slantingly into the longitudinal hollow channel defined by the opposite descendent sides, a leg extension integrally connected to the waist by a hinge of reduced thickness and provided with a front catch on its back, and a foot integrally connected to the end of the leg extension.

In use the leg extension is rotated 180 degrees around the hinge, thereby putting the foot and the leg extension in the hollow space of a head and the longitudinal channel, which is defined by the opposite descendent sides and the waist. The folded device is pushed in a fixing aperture of a first panel until the head of the device has been put on the upper surface of the first panel, and then the first panel is caught between the head and the side catches of the clamping device. The first panel is pushed on a second panel with the clamping device inserted in a fixing aperture, or, alternatively, an edge, of the underlying panel. Then, the underlying panel is caught in between the overlying panel and the front catch of the leg, which is pushed against the opening edges of the superposed panels by the resilient tongue, thereby assuring a reliable clamping of the panels. In unclamping, the foot is pushed against the intermediate inside surface of the head shell to disengage the front catch from the opening edge of the superposed panels, thus releasing the underlying panel. The upper half of the head-and-trunk is integrally connected to the lower half of the leg-and-foot by a hinge of reduced thickness in the straight and linear form. This form is advantageous to plastic molding.

Other objects and advantages of this invention will be understood from the following description of one preferred embodiment according to this invention, which is shown in accompanying drawings.

BRIEF DESCRIPTION OF THE DRAWING

FIG. 1 is a perspective view of a clamping device according to the embodiment of this invention.

FIG. 2 is a longitudinal section of the clamping device.

FIG. 3 is a perspective view of the folded clamping device with the leg-and-foot part pushed in the hollow space of the device.

FIG. 4 is a longitudinal section of the folded clamping device, catching one panel with its side catches.

FIG. 5 is another longitudinal section of the folded clamping device, clamping two panels with its front catch.

DESCRIPTION OF A PREFERRED EMBODIMENT

This invention relates to a clamp device for holding two panels with their surfaces laid on each other. It can also be used as a door or cover latching device.

FIGS. 1 and 2 show a plastic-molded clamp 1 according to this invention in its extended or stress-free condition. As shown, the hollow head 4 of the clamp 1 consists of three interconnected wall portions 3 and an inside flat projection 2 integrally connected to the lower edge of each wall portion 3. Two opposite depending side elements 5a are integrally connected to corresponding opposite portions of the inside flat projection 2 and extend downward therefrom. These depending side elements 5a are integrally connected by a cross waist 5b. A resilient tongue 13 is integrally connected at one end thereof to the intermediate portion of the flat projection 2 in the form of a cantilever. The tongue 13 projects slantingly inwardly with respect to the vertical, and it ends just above the cross waist 5b. Each depending side element 5a has a side catch 6 which extends upward from a raised lower edge of each element 5a which have increasing thickness. Each catch 6 ends with a shoulder 6' just below the undersurface of the inside flat projection 2. A leg extension 9 is connected to the cross waist 5b by a hinge 8 of reduced thickness. A foot 11 is integrally connected to the lower end of the leg extension 9. The leg extension 9 has a front catch 10 on its back, and the front catch 10 is reinforced with opposite side flanges 9a. As shown in these drawings, the opposite elements 5a and the cross waist 5b together define a longitudinal channel space for snugly accommodating the leg extension 9 when rotated 180 degrees around the hinge 8 of reduced thickness. Then, the square space defined by the three-sided wall 3 accommodates the foot 11, as shown in FIGS. 3, 4 and 5. In this folded position the leg-and-foot half is spring-biased so as to return to its original extended shape under the resilient influence of the hinge 8. Preferably, the foot 11 is chamfered at 12, and/or the inside flat projection 2 is chamfered at 12a, thereby preventing the foot 11 and the inside flat projection 2 from rubbing with each other.

In this particular embodiment the resilient tongue 13 projecting slantingly down into the longitudinally hollow space between elements 5a of the side engaging part 7, is connected at one end thereof to the intermediate part of the inside flat projection 2. Alternatively, tongue 13 may be connected to the leg extension 9 and act against waist 5a or its equivalent.

In use, a fixing aperture 14' is made, for instance, in a cover plate 14, which is to be fixed to a plate 15. The fixing aperture 14' of the cover plate 14 is large enough to allow the side engaging part 7 of the clamp to barely pass through the fixing aperture 14' with their side catches 6 yieldingly retired. In pushing the side engaging part of the clamp into the fixing aperture 14' the side elements 5a are somewhat compressed, thereby enabling the side engaging part 7 to pass through the fixing aperture 14' until the undersurface of the head 4 has been laid on the cover plate 14. Then, the side engaging part 7 of the clamp 1 is released to return to its original shape, thus causing the side catches 6 to engage the cover plate 14 with their shoulders 6' abutting against the undersurface of the cover plate 14 around the fixing aperture 14' therein. In pushing the side engaging part 7 of the clamp into the fixing aperture 14', the flanges 9a of the leg extension 9 are brought in contact with the corresponding edges of the fixing aperture 14', and the flanges 9a are pushed to retire yieldingly into the longitudinal channel defined between the opposite side elements 5a while depressing the resilient tongue 13. When the corresponding edge of the fixing aperture 14' climbs over the ramp flange 9a, the leg extension 9 springs back until the thinner portion 9b is brought in contact with the corresponding aperture edge.

A fixing aperture 15a is made in the second plate 15, such as a car body panel, to which the cover plate 14 is fixed with their surfaces laid on each other. The fixing aperture 15a of the car body panel is large enough to allow the side engaging part 7 of the clamp to barely pass through the fixing aperture 15a by collapsing yieldingly more or less. Also, the fixing aperture 15a is large enough to allow the front catch 10 to catch a corresponding edge of the aperture 15a under the resilient force of the tongue 13. In place of making a fixing aperture 15a in the plate 15, the plate 15 may be positioned with its edge 15b aligned with one opening edge which is to be caught with the front catch 10 of the clamp, as shown in FIG. 5.

The cover plate 14 and the clamp 1 fixed thereon are pushed together on the car body panel with the projecting part of the clamp inserted in the fixing aperture 15a of the fixing plate 15. Then, the front catch 10 is pushed back into the longitudinal channel between the opposite elements 5a overcoming the resilient force of the tongue 13. When the corresponding opening edge or the edge of the fixing plate 15 climbs over the flange ramp 9a, the front catch 10 springs back under the resilient influence of the tongue 13 to catch the undersurface of the fixing plate 15. Thus, the two plates 14 and 15 are clamped closely with their surfaces laid on each other.

When it is desired that the plates be unclamped from each other, the foot 11 is pushed against the intermediate portion of the interconnected wall portions 3 with the thumb, and then the front catch 10 is disengaged from the corresponding opening edge 15a or the edge 15b of the underlying plate 15. The cover plate 14 is then readily pulled off from the fixing plate 15.

The clamping force exerted by the clamp depends on the resilient force with which the leg 9 comes up from the longitudinal channel between the opposite depending side elements 5a. If this resilient force were generated simply by the hinge 8 of reduced thickness, the resultant clamping force would not be strong enough to assure reliable clamping. The clamping force of the leg, however, increases depending upon the strength of the backup force of the tongue 13, thus assuring reliable clamping. The strength of the clamping force depends mainly on the kind of plastic, the thickness of the tongue, the inclination of the tongue etc. Therefore, the clamping force can be controlled in terms of these factors, and a most reliable clamping device can be designed for clamping two plates with their surfaces laid on each other even in cases where frequent unclamping is desired. In the particular embodiment described so far, the foot 11 of the clamp is in the form of a square, but it may be in any other appropriate form, as for instance a polygonal shape or a semi-circle.

What is claimed is:

1. A device for clamping two plates closely with their surfaces placed on each other comprising: a hollow open sided head consisting of three interconnected wall portions and inner flat projections integrally connected to the lower edge of each wall portion forming a base for said head; two opposite depending side elements each provided with a one-way side catch, said elements integrally connected to each other with a cross waist; a tongue integrally connected at one end thereof to the intermediate inner flat portion of said base in the form of a cantilever and projecting slantingly in a longitudinal hollow channel defined by the opposite depending side elements; a leg extension integrally connected to said cross waist by a hinge of reduced thickness said leg provided with a front catch on its back; and a foot integrally connected to the end of the leg extension, whereby the leg is subjected to the repulsive resilient force of the tongue when the leg is folded around the hinge to fit in the longitudinal hollow channel.

2. A clamping device according to claim 1 wherein the resilient tongue is formed by a projecting piece partially separated from a part extending from the intermediate inner flat projection to the cross waist, thus extending slantingly from the intermediate inner flat projection into the longitudinal hollow channel.

3. A clamping device according to claim 2 wherein the foot is shaped and sized so as to fit in the space defined by the three interconnected wall portions of the head of the clamp.

4. A clamping device according to claim 1 wherein the foot is shaped and sized so as to fit in the space defined by the three interconnected wall portions of the head of the clamp.

* * * * *